(12) United States Patent
Fabbro (10) Patent No.: US 9,899,923 B2
(45) Date of Patent: Feb. 20, 2018

(54) EFFICIENT PFM SWITCH CONTROL FOR NON-INVERTING BUCK-BOOST CONVERTER

(71) Applicant: Infineon Technologies Austria AG, Villach (AT)

(72) Inventor: Simone Fabbro, Udine (IT)

(73) Assignee: Infineon Technologies Austria AG, Villach (AT)

( * ) Notice: Subject to any disclaimer, the term of this patent is extended or adjusted under 35 U.S.C. 154(b) by 602 days.

(21) Appl. No.: 14/104,432

(22) Filed: Dec. 12, 2013

(65) Prior Publication Data

US 2015/0171744 A1 Jun. 18, 2015

(51) Int. Cl.
*H02M 3/158* (2006.01)
*H02M 1/00* (2006.01)

(52) U.S. Cl.
CPC .. *H02M 3/1582* (2013.01); *H02M 2001/0054* (2013.01); *Y02B 70/1491* (2013.01)

(58) Field of Classification Search
CPC .......... H02M 3/04; H02M 2001/0054; H02M 3/1582; Y02B 70/1491
See application file for complete search history.

(56) References Cited

U.S. PATENT DOCUMENTS

| | | | |
|---|---|---|---|
| 6,329,801 B1 * | 12/2001 | Zuniga | H02M 3/1563 323/282 |
| 7,495,419 B1 | 2/2009 | Ju | |
| 7,652,453 B2 * | 1/2010 | Lulian | 323/259 |
| 7,733,072 B2 * | 6/2010 | Kanakubo | 323/271 |
| 8,659,282 B2 | 2/2014 | Chen | |
| 2006/0114624 A1 * | 6/2006 | Sharma | H02M 3/158 361/18 |
| 2006/0273768 A1 * | 12/2006 | Chen | H02M 3/157 323/224 |
| 2010/0066322 A1 | 3/2010 | Buethker | |

(Continued)

FOREIGN PATENT DOCUMENTS

CN 102427294 A 4/2012

OTHER PUBLICATIONS

Office Action, in the Chinese language, from counterpart Chinese Application No. 201410758564.1, dated Oct. 6, 2016, 14 pp.

*Primary Examiner* — Adolf Berhane
*Assistant Examiner* — Bart Iliya
(74) *Attorney, Agent, or Firm* — Shumaker & Sieffert, P.A.

(57) ABSTRACT

Methods, devices, and integrated circuits are disclosed for controlling a buck-boost converter. In one example, a device is configured to compare an output voltage at a voltage output with a low reference voltage and a high reference voltage. The device may compare a current at an inductor with a low threshold current and a high threshold current. The device may, responsive to the output voltage at the voltage output being lower than the low reference voltage, charge the inductor. The device may, responsive to the current at the inductor reaching the high threshold current, couple the inductor to the voltage output to transfer charge from the inductor to the voltage output. The device may, responsive to either the current at the inductor reaching the low threshold current or the output voltage reaching the high reference voltage, stop transferring charge from the inductor to the voltage output.

19 Claims, 8 Drawing Sheets

(56) References Cited

U.S. PATENT DOCUMENTS

| | | | |
|---|---|---|---|
| 2010/0237840 A1* | 9/2010 | Walter | H02J 7/0068 323/282 |
| 2011/0210712 A1* | 9/2011 | Tagare | 323/284 |
| 2012/0229110 A1 | 9/2012 | Huang et al. | |
| 2013/0169248 A1* | 7/2013 | Zhang et al. | 323/271 |

* cited by examiner

EFFICIENT PFM SWITCH CONTROL FOR NON-INVERTING BUCK-BOOST CONVERTER

TECHNICAL FIELD

The invention relates to electrical power converters, and in particular, to buck-boost converters.

BACKGROUND

Buck-boost converters may be used as drivers for loads with specific current and/or voltage requirements. A buck-boost converter may supply an output voltage that is greater than, less than, or equal to the input voltage. A non-inverting buck-boost converter may be used to supply an output voltage with the same polarity as the input voltage. A non-inverting buck-boost converter may use four switches connected around a single common inductor, with the switches controlling when the buck-boost converter operates in buck mode (i.e., output voltage lower than input voltage) or boost mode (i.e., output voltage higher than input voltage).

A non-inverting buck-boost converter may be controlled to operate in pulse frequency modulation (PFM) mode, typically when the required load current is relatively low. The converter may accumulate current energy in the inductor that the converter may then discharge in pulses or packets of current energy from the inductor to the output of the converter. The converter may discharge a train or series of multiple packets of energy (also referred to as bursts) to the output of the converter beginning when the output voltage falls below a triggering threshold and ending once the output voltage has risen to a sufficiency threshold. The converter may have an output capacitor coupled to the output that stores charge at the output.

The converter may then remain inactive while the output voltage lowers as the load on the output draws charge from the output capacitor. The output voltage may lower past the triggering threshold, and prompt the converter to begin discharging a train of inductor energy packets again. The converter therefore alternates its output voltage around two thresholds, the lower, triggering threshold and the higher, sufficiency threshold. The converter may experience a ripple voltage and overshoots beyond the voltage thresholds. Any converter also generates some energy loss between input and output. A converter's efficiency may be defined as a ratio of its output energy to its input energy. For a non-inverting buck-boost converter being operated in PFM mode, energy losses are typically due more to switching and dynamic losses (due to switch gate capacitance and V*I power dissipated across the switches during transitions) than to ohmic losses.

SUMMARY

In general, various examples of this disclosure are directed to a non-inverting buck-boost converter with an efficient pulse frequency modulation (PFM) switch control. In various examples of this disclosure, an efficient PFM switch control may control the switching of a buck-boost converter to limit ripple voltage and voltage threshold overshoots, and to reduce energy losses in switching operations, among other advantages. In various examples of this disclosure, an efficient PFM switch control may optimize for efficiency specifically for boost mode and/or for buck mode, and may select one or the other optimizing mode based on factors such as the inductor charging phase duration or a comparison between the input voltage and the output voltage.

One example is directed to a device for controlling a buck-boost converter, wherein the buck-boost converter comprises an inductor and a voltage output. The device is configured to compare an output voltage at the voltage output with a low reference voltage and a high reference voltage. The device is further configured to compare a current at the inductor with a low threshold current and a high threshold current. The device is further configured to, responsive to the output voltage at the voltage output being lower than the low reference voltage, charge the inductor. The device is further configured to, responsive to the current at the inductor reaching the high threshold current, couple the inductor to the voltage output to transfer charge from the inductor to the voltage output. The device is further configured to, responsive to either the current at the inductor reaching the low threshold current or the output voltage reaching the high reference voltage, stop transferring charge from the inductor to the voltage output.

Another example is directed to a method for controlling a buck-boost converter, wherein the buck-boost converter comprises an inductor and a voltage output. The method includes comparing an output voltage at the voltage output with a low reference voltage and a high reference voltage. The method further includes comparing a current at the inductor with a low threshold current and a high threshold current. The method further includes, responsive to the output voltage at the voltage output being lower than the low reference voltage, charging the inductor. The method further includes, responsive to the current at the inductor reaching the high threshold current, coupling the inductor to the voltage output to transfer charge from the inductor to the voltage output. The method further includes, responsive to either the current at the inductor reaching the low threshold current or the output voltage reaching the high reference voltage, stopping transferring charge from the inductor to the voltage output.

Another example is directed to an integrated circuit for controlling a buck-boost converter, wherein the buck-boost converter comprises an inductor and a voltage output. The integrated circuit is configured to compare an output voltage at the voltage output with a low reference voltage and a high reference voltage. The integrated circuit is further configured to compare a current at the inductor with a low threshold current and a high threshold current. The integrated circuit is further configured to, responsive to the output voltage at the voltage output being lower than the low reference voltage, charge the inductor. The integrated circuit is further configured to, responsive to the current at the inductor reaching the high threshold current, couple the inductor to the voltage output to transfer charge from the inductor to the voltage output. The integrated circuit is further configured to, responsive to either the current at the inductor reaching the low threshold current or the output voltage reaching the high reference voltage, stop transferring charge from the inductor to the voltage output.

The details of one or more examples of the invention are set forth in the accompanying drawings and the description below. Other features, objects, and advantages of the invention will be apparent from the description and drawings, and from the claims.

DETAILED DESCRIPTION

Figure 1:
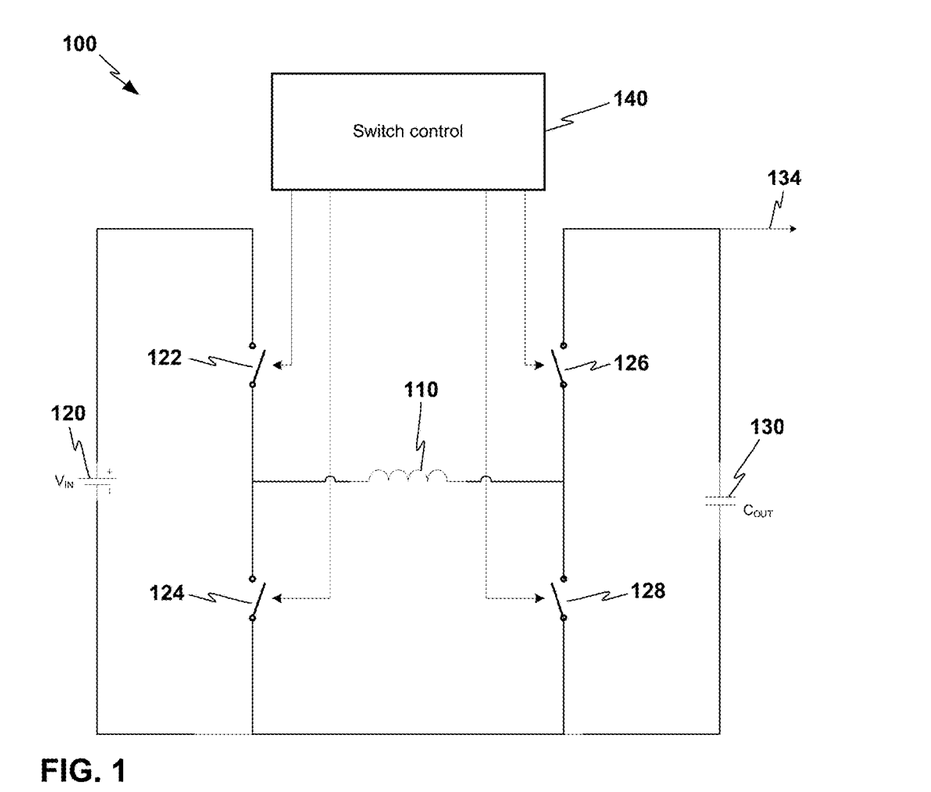
FIG. 1 is a block diagram illustrating a buck-boost converter with a switch control that may control buck-boost converter in an efficient pulse frequency modulation (PFM) mode, in accordance with an example of this disclosure.

FIG. 1 is a block diagram illustrating a buck-boost converter 100 with switch control 140 that may control buck-boost converter 100 in an efficient PFM mode, in accordance with an example of this disclosure. Buck-boost converter 100 includes a voltage input 120, a voltage output 134, an output capacitor 130, an inductor 110, and switches 122, 124, 126, and 128 coupled to inductor 110 in such a way as to apply different circuit connections across inductor 110. Voltage input 120 may be a structural element that conducts or generates an input voltage to buck-boost converter 100, and voltage output 134 may be a structural element that conducts an output voltage generated by buck-boost converter 100 to be available for a load. Buck-boost converter 100 further includes switch control 140, coupled to switches 122, 124, 126, and 128, in this illustrative example. Switch control 140 may control buck-boost converter 100 in an efficient PFM mode, in buck mode and/or boost mode, as further described below, in accordance with various illustrative examples. For example, switch control 140 may incorporate logic circuits, hardware, and/or one or more processors to control the states of switches 122, 124, 126, and 128 to operate buck-boost converter 100 with high efficiency, that is, with relatively low loss of energy between energy supplied via voltage input 120 and energy supplied to a load at voltage output 134. Switch control 140 may incorporate logic circuits, hardware and/or one or more processors to control the states of switches 122, 124, 126, and 128 to operate buck-boost converter 100 to limit modes of energy loss such as voltage overshoots. The processors, hardware and/or logic within switch control 140 may execute one or more algorithms consistent with the techniques described in this disclosure. For example, switch control 140 may incorporate inputs that indicate variables such as the inductor current (the current at inductor 110), the input voltage (the voltage at voltage input 120), and/or the output voltage (the voltage at voltage output 134), for example. Aspects of switch control 140, and various operating modes of buck-boost converter 100 under the control of switch control 140, are further described with reference to various examples below.

Figure 2:
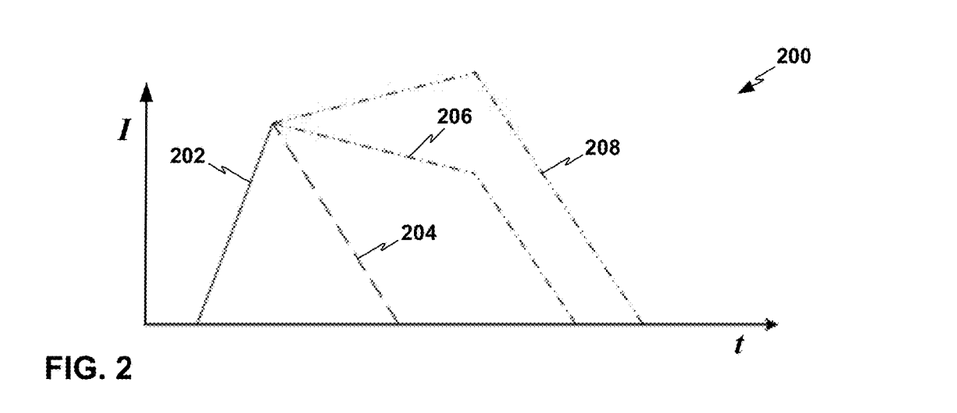
FIG. 2 shows a graph of current over time for three different examples of energy packets that a buck-boost converter may generate and transfer to a voltage output, in accordance with an example of this disclosure.

FIG. 2 shows a graph of current over time for three different examples of energy packets that buck-boost converter 100 may generate and transfer to voltage output 134, in accordance with an example of this disclosure. The current may, for example, be measured by a current sensor at inductor 110 (e.g., coupled to and with little physical and ohmic separation from inductor 110). Each energy transfer to voltage output 134 may include one or more energy packets, each of nominally the same form in pulse frequency modulation. In each of the three examples depicted in FIG. 2, the initial portion of the energy packet is defined by the current rise waveform 202 as the input voltage from voltage input 120 initially rises against the inductance of inductor 110. The differences between the three energy packet examples depicted in FIG. 2 are defined by the current drop-off waveforms 204, 206, and 208 as three different options for current drop-off that may be defined by the operation of switches 122, 124, 126, 128, in combination with whether the output voltage at voltage output 134 is greater than or less than the input voltage at voltage input 120.

The energy contained within each packet is proportional to the area bounded by current rise 202 and one of current drop-off waveforms 204, 206, 208 as shown in FIG. 2. That is, the area in graph 200 represents an integration of current over time, and thereby defines a charge; and the energy supplied by buck-boost converter 100 at voltage output 134 is a product of this charge and the output voltage at voltage output 134 (i.e., the energy is an integration of the voltage times the current over time).

Current drop-off waveform 204 is the most rapid current drop-off of the three options in graph 200, and, together with current rise waveform 202, forms the smallest area on graph 200 of the three options, indicating the smallest amount of energy per packet or per pulse. Current drop-off waveform 206 is more gradual, and together with current rise waveform 202 forms an intermediate area on graph 200, indicating an intermediate amount of energy per packet. Current drop-off waveform 208 is the most gradual drop-off, and includes a moderate further rise in current beyond the peak of current rise waveform 202 before declining.

Together with current rise waveform 202, current drop-off waveform 208 forms the largest area of the three options on graph 200, indicating a larger amount of energy per packet. Switch control 140 may operate buck-boost converter 100 to generate energy packets in accordance with any of the three optional forms described by waveforms 204, 206, and 208 in combination with waveform 202. By selecting among these three energy packet forms, switch control 140 may operate buck-boost converter 100 to transfer maximum energy to voltage output 134, minimize switchings (changes of state of one or more of switches 122, 124, 126, 128) and thereby minimize dynamic losses (from switch gate capacitance and V*I power dissipated across the switches during switching transitions), and/or limit voltage overshoots.

In some examples, generally, switch control 140 may operate buck-boost converter 100 to transfer energy in PFM mode by maximizing operations that involve switching only two out of the four switches 122, 124, 126, 128. In some examples of such a two-switch maximizing mode, switch control 140 may maintain the two other switches in an unchanging state under most conditions, and only perform switching of these other two dormant switches for auxiliary or extraordinary functions. In particular, in some examples of a two-switch maximizing mode, in nominal operation in buck mode, switch control 140 may leave switch 126 on (i.e., closed or connected) and leave switch 128 off (i.e., open or disconnected) while performing active switching only on switches 122 and 124; and in nominal operation in boost mode, switch control 140 may leave switch 122 on and leave switch 124 off while performing active switching only on switches 126 and 128. In some examples of a two-switch maximizing mode, switch control 140 may only exit such a nominal operation mode and actively switch one of the two dormant switches for auxiliary or extraordinary functions, such as to limit or end an overshoot at voltage output 134 or to minimize voltage ripple at voltage output 134. In some examples, switch control 140 may determine whether to operate in buck or boost mode based on an input that indicates a current rising time of inductor 110, or based directly on an input that indicates the input voltage at voltage input 120.

Figure 3:
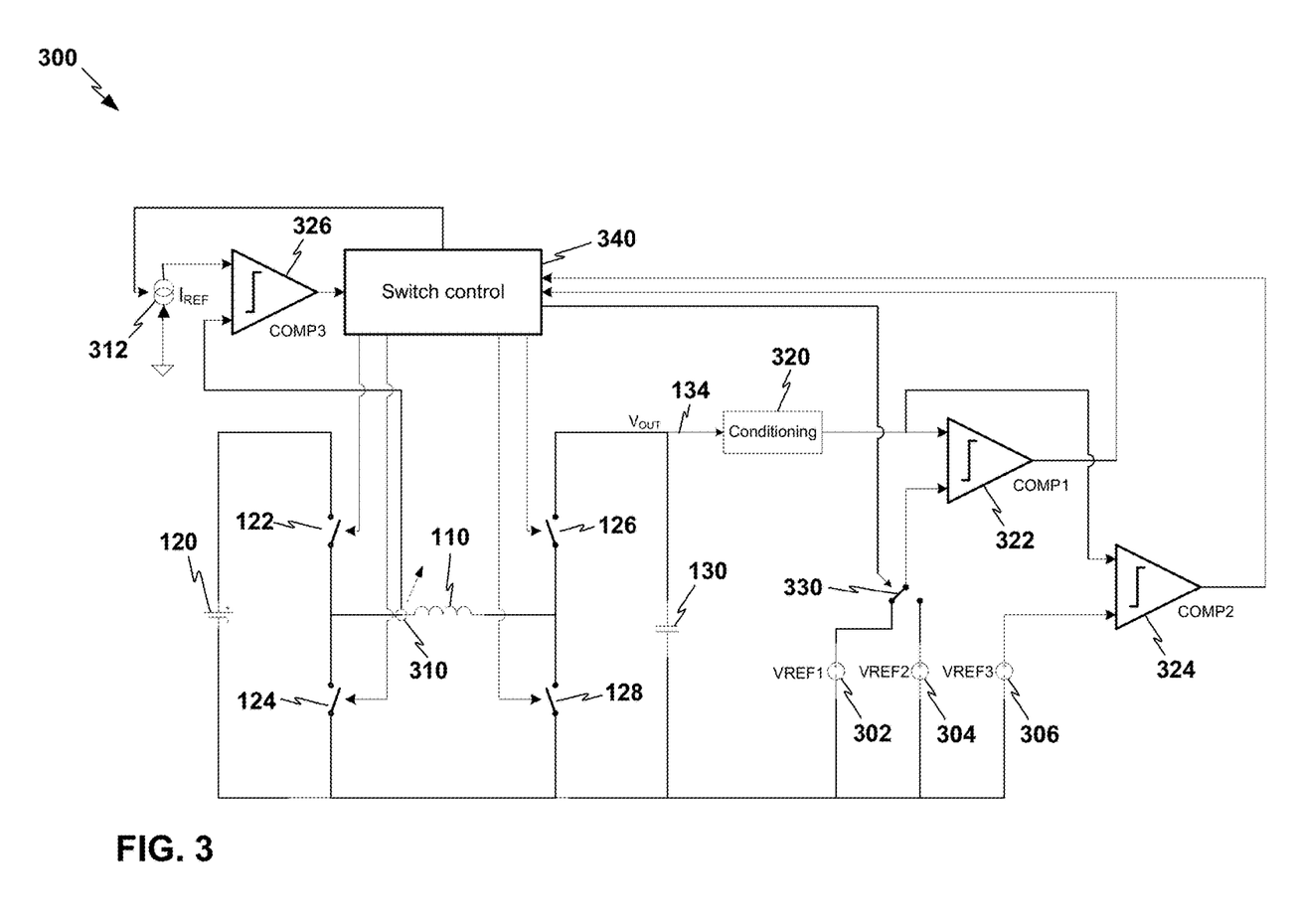
FIG. 3 is a block diagram illustrating a buck-boost converter with a switch control that may control the buck-boost converter in an efficient PFM mode with multiple overshoot safeguards, in accordance with an example of this disclosure.
Figure 4:
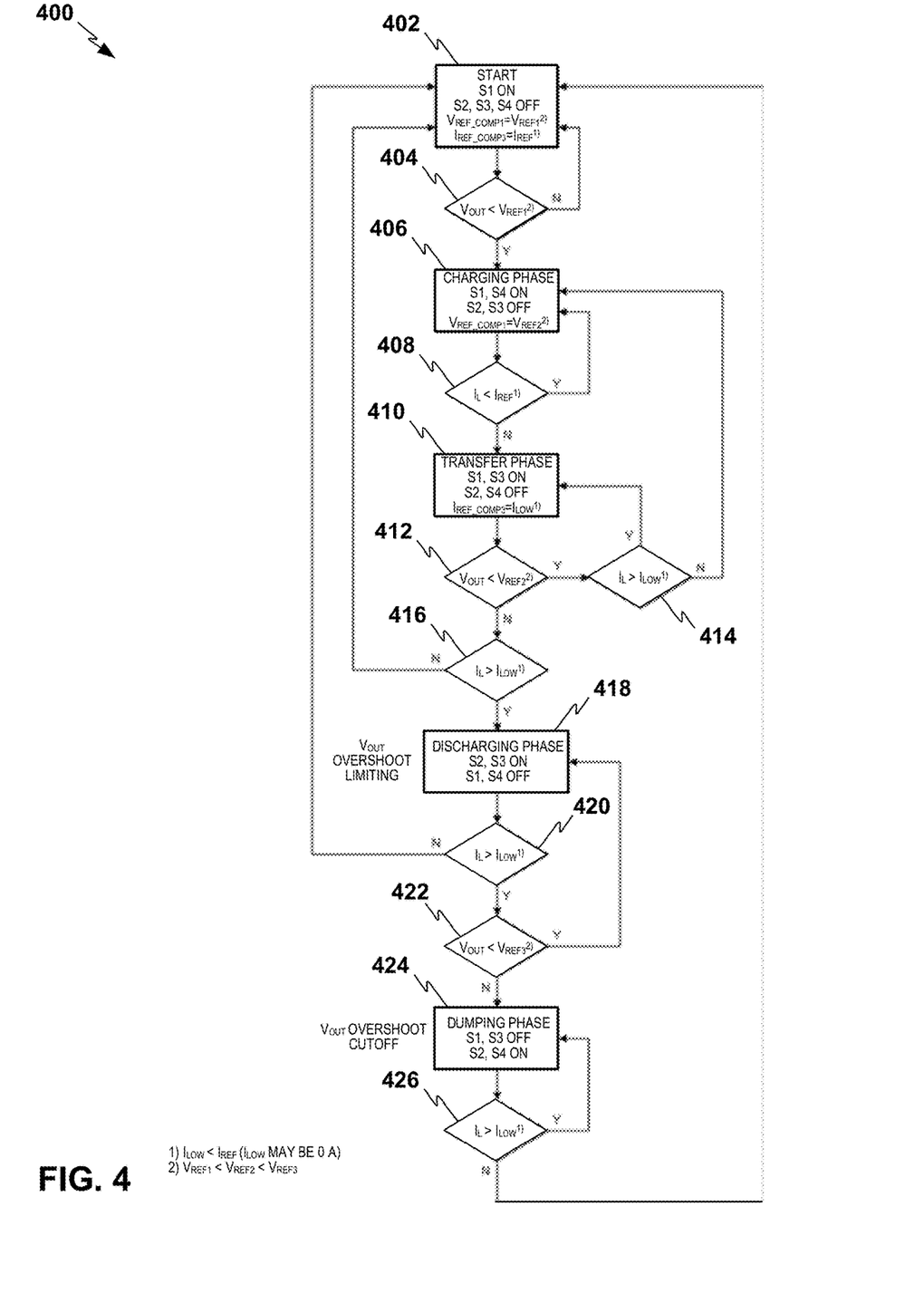
FIG. 4 is a flowchart illustrating a method of operating a buck-boost converter in a way that limits voltage overshoot and enhances efficiency in boost mode, among other advantages, in accordance with an example of this disclosure.

FIG. 3 is a block diagram illustrating a buck-boost converter 300 with switch control 340 that may control buck-boost converter 300 in an efficient PFM mode with multiple overshoot safeguards, in accordance with an example of this disclosure. FIG. 4 is a flowchart illustrating a method 400 of operating buck-boost converter 300 in a way that limits voltage overshoot and enhances efficiency in boost mode, among other advantages, in accordance with an example of this disclosure. Aspects of method 400 of FIG. 4 are referenced below to describe aspects of operating buck-boost converter 300 of FIG. 3. Buck-boost converter 300 in the example of FIG. 3 may enhance efficiency, particularly for applications requiring a buck-boost converter to operate largely or almost entirely in boost mode, or applications for which the buck-boost converter supplies an output voltage higher than its input voltage.

Buck-boost converter 300 in the example of FIG. 3 includes several components that are the same as in the example of FIG. 1, including voltage input 120, voltage output 134, an output capacitor 130, an inductor 110, and switches 122, 124, 126, and 128 coupled to inductor 110 in such a way as to apply different circuit connections across inductor 110. Buck-boost converter 100 further includes switch control 340, which may control switches 122, 124, 126, and 128 to operate buck-boost converter 300 in a way that limits voltage overshoot and enhances efficiency in boost mode, among other advantages.

Buck-boost converter 300 also includes voltage references 302, 304, and 306, inductor current sensor 310, current reference 312, conditioner 320, comparators 322, 324, and 326, and voltage reference switch 330. Voltage references 302, 304, and 306 each generate a respective reference voltage. Current sensor 310 and comparators 322, 324, and 326 all provide outputs to switch control 340, enabling switch control 340 to evaluate and react to a variety of conditions in the state of buck-boost converter 300. Conditioner 320 conditions the output of voltage output 134 and feeds into one input each of comparators 322 and 324. Switch control 340 also includes control outputs to voltage reference switch 330 and current reference 312, in addition to its control outputs to switches 122, 124, 126, and 128, enabling switch control 340 to alternate between voltage references 302 and 304 as the other input to comparator 322, and to control current reference 312, which may be a programmable current reference. Voltage reference 306 provides the second input to comparator 324. Current reference 312 and inductor current sensor 310 provide the inputs to comparator 326.

Switch control 340 may compare various voltages in buck-boost converter 300 with reference to a minimum output voltage ($V_{OUT\_MIN}$) and a nominal output voltage ($V_{OUT\_NOM}$) at voltage output 134, in comparison with a first reference voltage ($V_{REF1}$, i.e., a low reference voltage) at voltage reference 302, a second reference voltage ($V_{REF2}$, i.e., a high reference voltage) at voltage reference 304, and a third reference voltage ($V_{REF3}$, i.e., a maximum upper limit reference voltage) at voltage reference 306. In particular, switch control 340 may operate with in keeping with $V_{REF1}$ being greater than $V_{OUT\_MIN}$, $V_{OUT\_NOM}$ being greater than $V_{REF1}$, $V_{REF2}$ being greater than or equal to $V_{OUT\_NOM}$, and $V_{REF3}$ being greater than $V_{REF2}$, as also expressed in Equation 1 below:

$$V_{OUT\_MIN} < V_{REF1} < V_{OUT\_NOM} <= V_{REF2} < V_{REF3} \qquad \text{(Eq. 1)}$$

The components depicted for buck-boost converter 300 are further described with reference to flowchart for method 400 of FIG. 4. As shown in the flowchart for method 400, switch control 340 may operate buck-boost converter 300 in an initial phase in which switch 122 (S1, as referenced in FIG. 4) is on and switches 124, 126, and 128 (S2, S3, and S4, respectively, as referenced in FIG. 4) are off (402). If an output voltage ($V_{OUT}$) at voltage output 134 is less than the first reference voltage ($V_{REF1}$) at voltage reference 302 (404), switch control 340 may commence operating buck-boost converter 300 in a charging phase (406) to charge inductor 110.

In the charging phase (406), switch control 340 sets switches 122 and 128 on and switches 124 and 126 off, thereby forming a conductive path connecting voltage input 120, inductor 110, and output capacitor 130, thereby charging inductor 110. In this charging phase, inductor 110 accumulates inductive current and energy. Output capacitor 130 also accumulates charge. Switch control 340 may compare the inductor current ($I_L$ as referenced in FIG. 4) at inductor 110 with a high threshold current, i.e., the reference current ($I_{REF}$, as referenced in FIG. 4) and with a low threshold current ($I_{LOW}$). Switch control 340 may continue the charging phase as long as the inductor current ($I_L$) at inductor 110, as sensed by inductor current sensor 310, is less than the reference current ($I_{REF}$) from current reference 312 (408).

Once the inductor current is no longer less than the reference current (or high threshold current), switch control 340 may reconfigure switches 124 (S2) and 126 (S3) to operate buck-boost converter 300 in a transfer phase (410) to transfer energy from inductor 110 to voltage output 134. In particular, switch control 340 turns switch 124 off and turns switch 126 on, so that switches 122 and 126 are on and switches 124 and 128 are off. Switch control 340 thereby configures buck-boost converter 300 with a conductive path from voltage input 120 through inductor 110 to voltage output 134, enabling the transfer of current and energy from inductor 110 to voltage output 134, with ongoing charging of inductor 110 from voltage input 120.

During the transfer phase (410), switch control 340 monitors the output voltage ($V_{OUT}$) at voltage output 134 in comparison with the second voltage reference ($V_{REF2}$) at voltage reference 304 (412). Switch control 340 also monitors the inductor current ($I_L$) at inductor 110 with reference to a reference low current or low threshold current ($I_{LOW}$) (414, 416). The reference low current may be zero amps, or another value of current that is low relative to nominal current levels for inductor 110, in various examples. Switch control 340 may continue maintaining buck-boost converter 300 in the transfer phase (410) for as long as switch control 340 detects that the output voltage ($V_{OUT}$) at voltage output 134 is less than the second voltage reference ($V_{REF2}$) at voltage reference 304 (412), and that the inductor current ($I_L$) at inductor 110 is greater than the reference low current ($I_{LOW}$) (414). If switch control 340 detects that the output voltage ($V_{OUT}$) at voltage output 134 is less than the second voltage reference ($V_{REF2}$) at voltage reference 304 (412), and that the inductor current ($I_L$) at inductor 110 is not greater than the reference low current ($I_{LOW}$) (414), switch control 340 may reconfigure buck-boost converter 300 to operate in the charging phase again (406), by turning switch 124 on again and turning switch 126 off again.

If switch control 340 detects that the output voltage ($V_{OUT}$) at voltage output 134 is not less than the second voltage reference ($V_{REF2}$) at voltage reference 304 (412), and that the inductor current ($I_L$) at inductor 110 is greater than the reference low current ($I_{LOW}$) (416), switch control 340 may reconfigure buck-boost converter 300 to operate in a discharging phase (418). The second voltage reference ($V_{REF2}$) at voltage reference 304 may be set to be greater than but relatively close to the input voltage ($V_{IN}$) at voltage input 120. These prerequisite conditions (412 and 416) may occur relatively rarely in properly defined operating conditions, so that it is relatively rare for switch control 340 to configure buck-boost converter 300 in the discharging phase (418) in those operating conditions.

Switch control 340 may configure buck-boost converter 300 for the discharging phase (418) by turning switch 122 (S1) off and turning switch 124 (S2) on, while leaving switch 126 (S3) on and leaving switch 128 (S4) off. As can be seen in FIG. 3, this discharging phase configuration isolates inductor 110 from voltage input 120, and configures a conductive path from output capacitor 130 to voltage output 134 through inductor 110. This configuration enables inductor 110 and output capacitor 130 to discharge to voltage output 134 while declining in current. Therefore, in this discharging phase (418), responsive to the output voltage at the voltage output being higher than the reference voltage, and the current at the inductor being higher than the threshold current, switch control 340 configures buck-boost converter 300 to couple the output capacitor to the voltage output through the inductor, thereby discharging the inductor 110. This discharging phase (418) may therefore mitigate overshoot at voltage output 134, while continuing to provide current at voltage output 134, in this example.

Method 400 of FIG. 4 includes a further configuration that switch control 340 may impose on buck-boost converter 300 under certain conditions, referred to as a dumping phase (424). Switch control 340 may access the dumping phase (424) under certain conditions typically more rare than the prerequisite conditions for the discharging phase (418). In particular, switch control 340 may engage buck-boost converter 300 in the dumping phase (424) only if the inductor current ($I_L$) is greater than a reference low current ($I_{LOW}$) (420), and the output voltage ($V_{OUT}$) at voltage output 134 is not less than the third reference voltage ($V_{REF3}$) at voltage reference 306 (422). The dumping phase (424) may generally act to cut off overshoot, and to dump energy from inductor 110 (or transfer energy from inductor 110 to output capacitor 130), in case the output voltage at voltage output 134 exceeds a certain voltage threshold set by the third reference voltage ($V_{REF3}$) at voltage reference 306 despite buck-boost converter 300 already being in discharge phase (418). The third reference voltage ($V_{REF3}$) is intended as a maximum upper limit that is intended to be enforced on the output voltage of buck-boost converter 300, i.e., at the voltage output 134. This dumping phase (424) may therefore act as a further safeguard on the output voltage of buck-boost converter 300, though with the trade-off of loss of energy and decrease in efficiency if the dumping phase (424) is invoked.

In particular, to engage the dumping phase (424) from the configuration of the discharging phase (418), switch control 340 turns switch 126 (S3) off and turns switch 128 (S4) on, while keeping switch 124 (S2) on and switch 122 (S1) off. As seen in FIG. 3, this dumping phase (424) configuration isolates inductor 110 from voltage output 134 and cuts off delivery of current and energy to voltage output 134. As seen in FIG. 3, this dumping phase (424) configuration isolates inductor 110 from voltage input 120, and forces inductor 110 to discharge internally within buck-boost converter 300 (transferring energy from inductor 110 to output capacitor 130), toward near-equilibrium with output capacitor 130 and in internal ohmic losses in inductor 110 and in the circuit pathway through switch 124 (S2) and switch 128 (S4). This dumping phase (424) therefore necessarily causes loss of useful energy and reduction in efficiency, but enables a complete cutoff of voltage overshoot at voltage output 134, enforcing a hard limit on potential voltage overshoot by buck-boost converter 300.

Switch control 340 may maintain buck-boost converter 300 in the dumping phase (424) for as long as the inductor current ($I_L$) at inductor 110 is greater than the reference low current ($I_{LOW}$) (426). Once inductor current ($I_L$) at inductor 110 is not greater than the reference low current ($I_{LOW}$) (426), switch control 340 may reconfigure buck-boost converter 300 to the starting phase (402), and to the charging phase (406) if the voltage threshold condition of voltage output 134 being less than the first reference voltage ($V_{REF1}$) at voltage reference 302 (404) is also met.

In many cases, the prerequisite conditions for invoking the discharging phase (412 and 416) may never be invoked, and active operations of buck-boost converter 300 may alternate only between the charging phase (406) and the transfer phase (410). In these cases, switch control 340 operates buck-boost converter 300 to maintain switch 122 (S1) always on and switch 124 (S2) always off, while only switching switches 128 (S4) and 126 (S3) on and off. Method 400 of FIG. 4 therefore substantially limits the amount of switching to be performed, and therefore limits dynamic losses due to switching, and the accompanying inductive and capacitive impedance, which are generally the major sources of inefficiency in low-current, pulse frequency modulation (PFM) operating modes. Method 400 of FIG. 4 also mitigates or completely cuts off voltage overshoot at voltage output 134 of buck-boost converter 300 when needed, as auxiliary functions, and only switches switch 124 (S2) alone or in combination with switch 128 (S4), with the accompanying extra contribution to dynamic switching losses, only as needed to perform those auxiliary functions.

The conditions for switch control 140 to configure buck-boost converter 300 in the dumping phase (424) may occur rarely or possibly never, in operating conditions in which the output voltage at voltage output 134 is significantly greater than the input voltage at voltage input 120. The conditions for switch control 140 to configure buck-boost converter 300 in the dumping phase (424) may tend to occur occasionally or somewhat regularly in operating conditions in which the output voltage at voltage output 134 is close to or even marginally lower than the input voltage at voltage input 120. In operating conditions in which the output voltage at voltage output 134 is substantially lower than the input voltage at voltage input 120, the conditions for switch control 140 to configure buck-boost converter 300 in the dumping phase (424) may occur more regularly. For various applications in which the output voltage at voltage output 134 is lower than the input voltage at voltage input 120, the examples of FIGS. 5-8 may provide additional advantages in efficiency, among other advantages.

Figure 5:
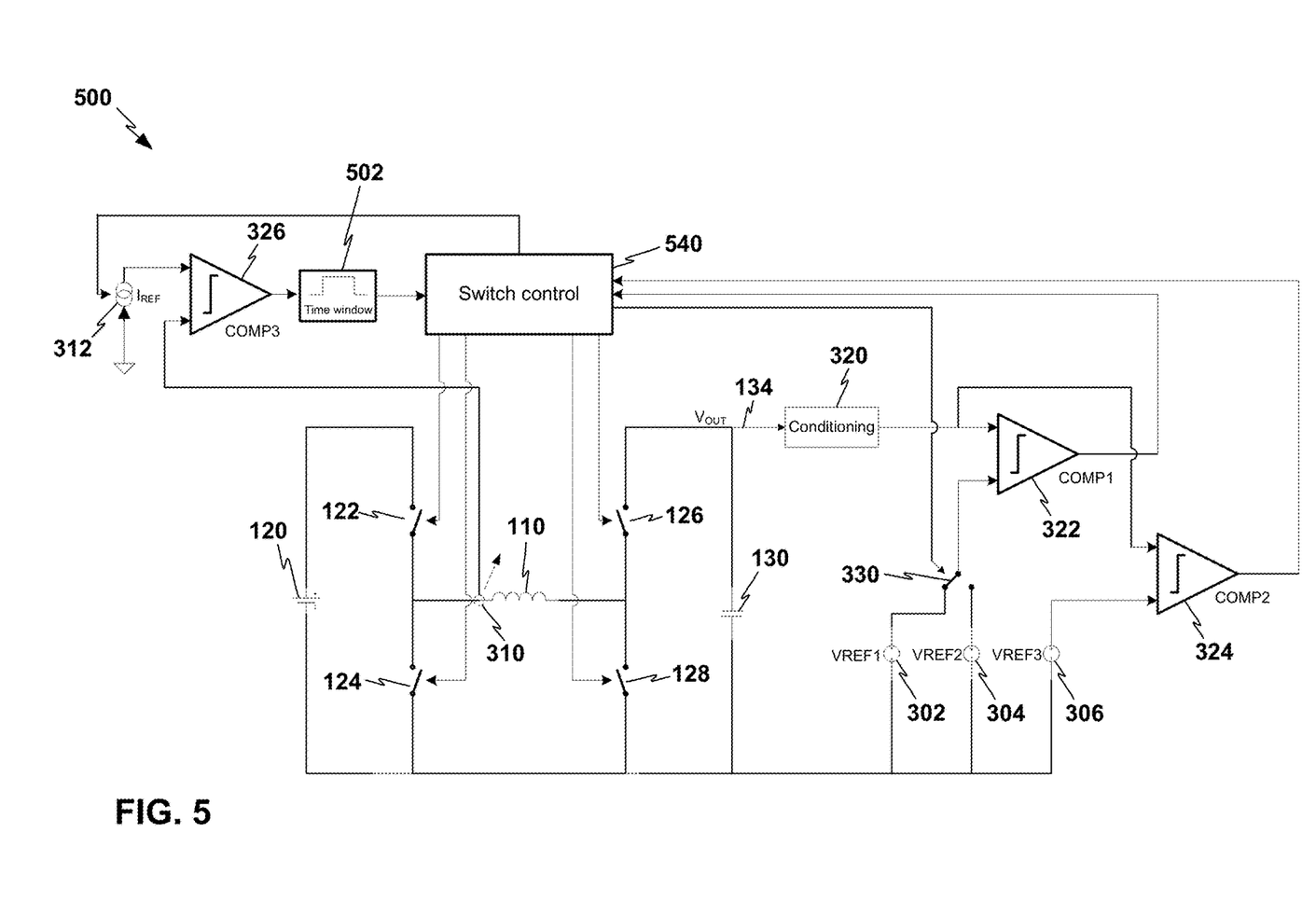
FIG. 5 is a block diagram illustrating a buck-boost converter with a switch control that may control the buck-boost converter in an efficient PFM mode with multiple overshoot safeguards, efficient time-controlled switching, and specific discharging phases for boost and buck modes, in accordance with another example of this disclosure.
Figure 6:
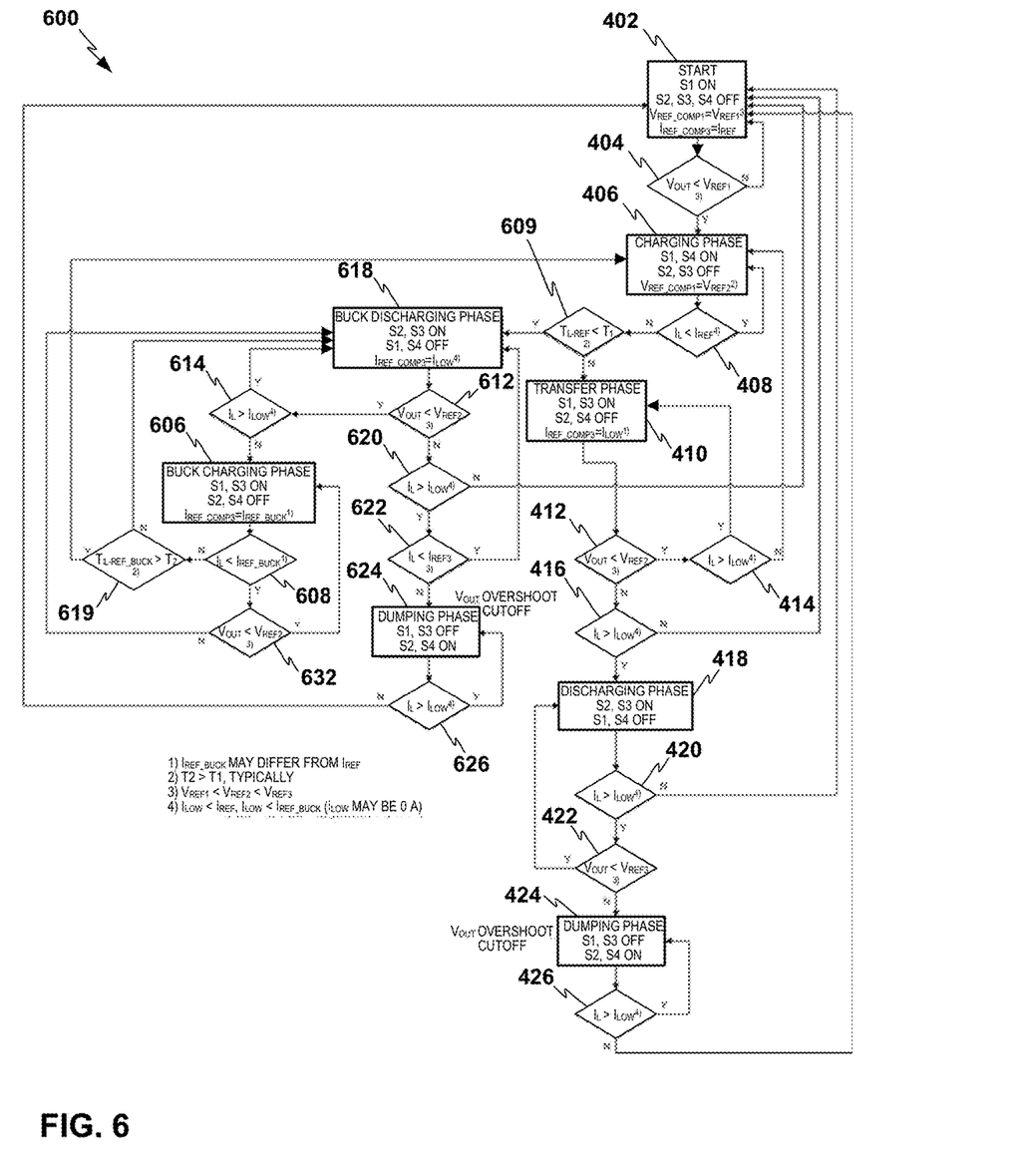
FIG. 6 is a flowchart illustrating a method of operating a buck-boost converter in a way that limits voltage overshoot and enables specific discharging phases for boost and buck modes, enhancing efficiency in both boost and buck modes based on efficient time-controlled switching, among other advantages, in accordance with an example of this disclosure.

FIG. 5 is a block diagram illustrating a buck-boost converter 500 with switch control 540 that may control buck-boost converter 500 in an efficient PFM mode with multiple overshoot safeguards, efficient time-controlled switching, and specific discharging phases for boost and buck modes, in accordance with another example of this disclosure. FIG. 6 is a flowchart illustrating a method 600 of operating buck-boost converter 500 in a way that limits voltage overshoot and enables specific discharging phases for boost and buck modes, enhancing efficiency in both boost and buck modes based on efficient time-controlled switching, among other advantages, in accordance with an example of this disclosure. Aspects of method 600 of FIG. 6 are referenced below to describe aspects of operating buck-boost converter 500 of FIG. 5. Buck-boost converter 500 in the example of FIG. 5 may enhance efficiency flexibly in applications of a buck-boost converter operating in boost and/or buck modes, among other advantages.

Buck-boost converter 500 in the example of FIG. 5 includes several components that are the same as in the examples of FIGS. 1 and 3, including voltage input 120, voltage output 134, output capacitor 130, inductor 110, switches 122, 124, 126, and 128, voltage references 302, 304, and 306, inductor current sensor 310, current reference 312, conditioner 320, comparators 322, 324, and 326, and voltage reference switch 330. Buck-boost converter 500 further includes switch control 540, which may control switches 122, 124, 126, and 128 to operate buck-boost converter 500 in a way that limits voltage overshoot, uses time-controlled switching, and enhances efficiency with specific discharging phases for boost and buck modes, among other advantages.

Buck-boost converter 500 also includes time window component 502 that receives the output of comparator 326 and provides an output to switch control 540. Time window component 502 enables switch control 540 to improve efficiency with a time controlled switching sequence. Switch control 540 may engage buck-boost converter 500 in separate operations for buck and boost modes. Switch control 540 may receive an input that conveys the input voltage at voltage input 120, and determine whether to engage buck-boost converter 500 in a buck mode or a boost mode based at least in part on a comparison of whether the output voltage at voltage output 134 is greater than or less than the input voltage at voltage input 120. In particular, switch control 540 may opt to use buck mode operations when the output voltage is less than the input voltage, and boost mode operations when the output voltage is greater than the input voltage. This buck or boost mode decision and the use of time controlled switching based on the input of the time window component 502 by switch control 540 are further described below with reference to FIG. 6.

As shown in FIG. 6, method 600 includes substantial overlap with method 400 of FIG. 4, with a point of departure from method 400 at decision point 609, and substantial material related to buck operations from decision point 609. Method 600 begins identically to method 400 (402, 404, 406, 408). Then, where method 400 begins the transfer phase (408), method 600 includes switch control 540 also first evaluating the input from time window component 502 to gauge whether the inductor charging phase duration ($t_{L\_REF}$) is less than a time reference ($t_1$) (609). If the inductor charging phase duration ($t_{L\_REF}$) is not less than a time reference ($t_1$), switch control 540 engages buck-boost converter 500 in boost mode operations identical to the remainder of method 400 shown in FIG. 4, beginning with transfer phase (410) and continuing through the remainder of method 400 (410, 412, 414, 416, 418, 420, 422, 424, 426). If the inductor charging phase duration ($t_{L\_REF}$) is less than the time reference ($t_1$), switch control 540 engages buck-boost converter 500 in buck mode operations, beginning with a buck discharging phase (618).

To engage the buck-boost converter 500 in the buck discharging phase (618) from the charging phase (406), switch control 540 switches all four switches 122, 124, 126, 128 from their state in the charging phase (406), turning switches 122 and 128 from on to off, and switches 124 and 126 from off to on. This buck discharging phase (618) couples inductor 110 to output capacitor 130 and enables buck-boost converter 500 to discharge energy from the inductor 110 to voltage output 134, as discussed above. Therefore, in this discharging phase (618), responsive to the output voltage at the voltage output being lower than the reference voltage $V_{REF2}$, and the current at the inductor being higher than the low threshold current, switch control 540 configures buck-boost converter 500 to couple the output capacitor to the voltage output through the inductor, thereby discharging the inductor 110.

From the buck discharging phase (618), switch control may compare the output voltage ($V_{OUT}$) at voltage output 134 to the second reference voltage ($V_{REF2}$) at voltage reference 304 (612), and compare the inductor current ($I_L$, as referenced in FIG. 6) at inductor 110 with the reference low current ($I_{LOW}$, as referenced in FIG. 6) (614, 620). From the buck discharging phase (618), if the output voltage ($V_{OUT}$) is less than the second reference voltage ($V_{REF2}$) and the inductor current ($I_L$) is not greater than the reference low current ($I_{LOW}$), switch control 540 engages a buck charging phase (606) by turning switch 124 (S2) off and turning switch 122 (S1) on. Switch control 540 may maintain buck-boost converter 500 in the buck charging phase (606) as long as the inductor current ($I_L$) is less than a buck reference current ($I_{REF\_BUCK}$) and the output voltage ($V_{OUT}$) at voltage output 134 is less than the second reference voltage ($V_{REF2}$). If the inductor current ($I_L$) remains less than the buck reference current ($I_{REF\_BUCK}$) (608) and the output voltage ($V_{OUT}$) at voltage output 134 is not less than the second reference voltage ($V_{REF2}$) (632), switch control 540 may return to the buck discharging phase (618). If the inductor current ($I_L$) is not less than the buck reference current ($I_{REF\_BUCK}$) (608) and the output voltage ($V_{OUT}$) at voltage output 134 is less than the second reference voltage ($V_{REF2}$) (632), switch control 540 may evaluate the input from time window component 502 to gauge whether a buck mode inductor charging phase duration ($t_{IL\_REF\_BUCK}$) is greater than a second time reference ($t_2$) (619). If the buck mode inductor charging phase duration ($t_{IL\_REF\_BUCK}$) is greater than the second time reference ($t_2$) (619), switch control 540 may return buck-boost converter 500 to the charging phase (406). If the buck mode inductor charging phase duration ($t_{IL\_REF\_BUCK}$) is not greater than the second time reference ($t_2$) (619), switch control 540 may return buck-boost converter 500 to the buck discharging phase (618).

From the buck discharging phase (618), if the output voltage ($V_{OUT}$) is less than the second reference voltage ($V_{REF2}$) (612), and the inductor current ($I_L$) is greater than the reference low current ($I_{LOW}$) (614), switch control 540 continues operating buck-boost converter 500 in the buck discharging phase (618). From the buck discharging phase (618), if the output voltage ($V_{OUT}$) is not less than the second reference voltage ($V_{REF2}$) (612) and the inductor current ($I_L$) is not greater than the reference low current ($I_{LOW}$) (620), switch control 540 returns buck-boost converter 500 to the initial phase (402). From the buck discharging phase (618), if the output voltage ($V_{OUT}$) is not less than the second reference voltage ($V_{REF2}$) (612), the inductor current ($I_L$) is greater than the reference low current ($I_{LOW}$) (620), and the output voltage ($V_{OUT}$) at voltage output 134 is less than the third reference voltage ($V_{REF3}$) at voltage reference 306, switch control 540 returns buck-boost converter 500 to the buck discharging phase (618).

From the buck discharging phase (618), if the output voltage ($V_{OUT}$) is not less than the second reference voltage ($V_{REF2}$) (612), the inductor current ($I_L$) is greater than the reference low current ($I_{LOW}$) (620), and the output voltage ($V_{OUT}$) at voltage output 134 is not less than the third reference voltage ($V_{REF3}$) at voltage reference 306, switch control 540 engages buck-boost converter 500 in a dumping phase (624). This dumping phase (624) isolates inductor 110 from voltage output 134 and cuts off potential voltage overshoot at voltage output 134, as described above with reference to dumping phase (424) in method 400 of FIG. 4. This dumping phase (624) may continue as long as the inductor current ($I_L$) is greater than the reference low current ($I_{LOW}$) (626), after which switch control 540 returns buck-boost converter 500 to the buck discharging phase (618).

Method 600 of FIG. 6, therefore, may include various techniques for enhancing the efficiency of buck-boost converter 500 specifically for buck mode or boost mode. Method 600 of FIG. 6 may also include discharging phases (418, 618) that may mitigate potential voltage overshoot in either boost mode or buck mode, and dumping phases (424, 624) that may cut off potential voltage overshoot in either boost mode or buck mode. However, by applying specific strategies for boost and buck mode, method 600 may make it even more unlikely (relative to method 400 of FIG. 4) that a discharging phase or particularly a dumping phase may be required.

In particular, method 400 may include a single decision point (422) based on a comparison of the output voltage ($V_{OUT}$) at voltage output 134 with a reference voltage ($V_{REF3}$) at voltage reference 306 (422) for triggering the dumping phase (424). In comparison, method 600 may include multiple strategies and multiple sets of conditions with reference to the output voltage for operating without having to resort to a dumping phase (424, 624). In both methods 400 and 600, the switch control (340, 540) can avoid the inefficient use of energy of internally dumping the current energy of inductor 110 (and completely avoid switching switch 128 (S4)) if it avoids the dumping phase, thereby avoiding significant dynamic losses. Method 600 therefore includes several means of enhancing the efficiency of the operation of buck-boost converter 500.

Figure 7:
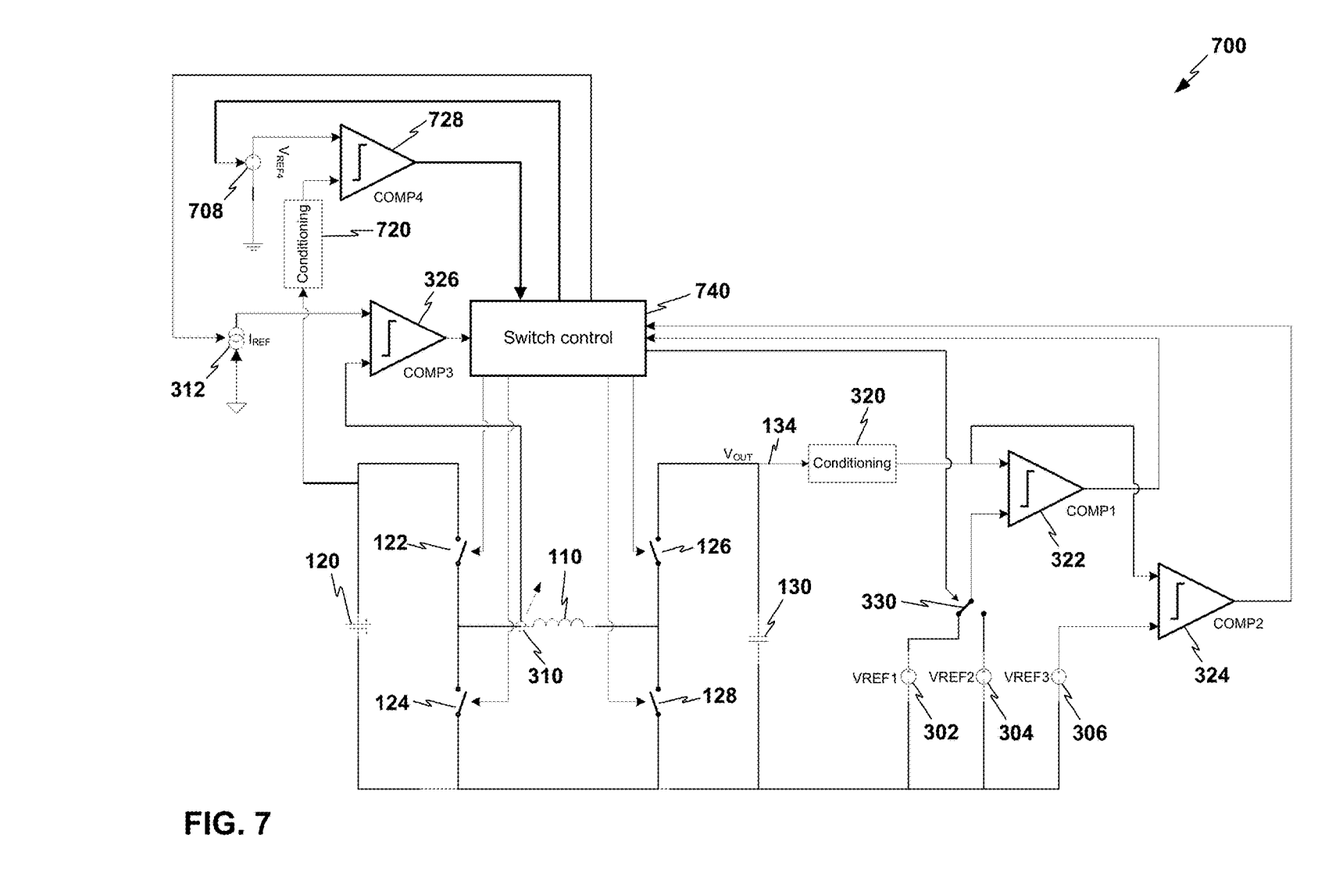
FIG. 7 is a block diagram illustrating a buck-boost converter with a switch control that may control the buck-boost converter in an efficient PFM mode with multiple overshoot safeguards, efficient input voltage-controlled switching, and specific discharging phases for boost and buck modes, in accordance with another example of this disclosure.
Figure 8:
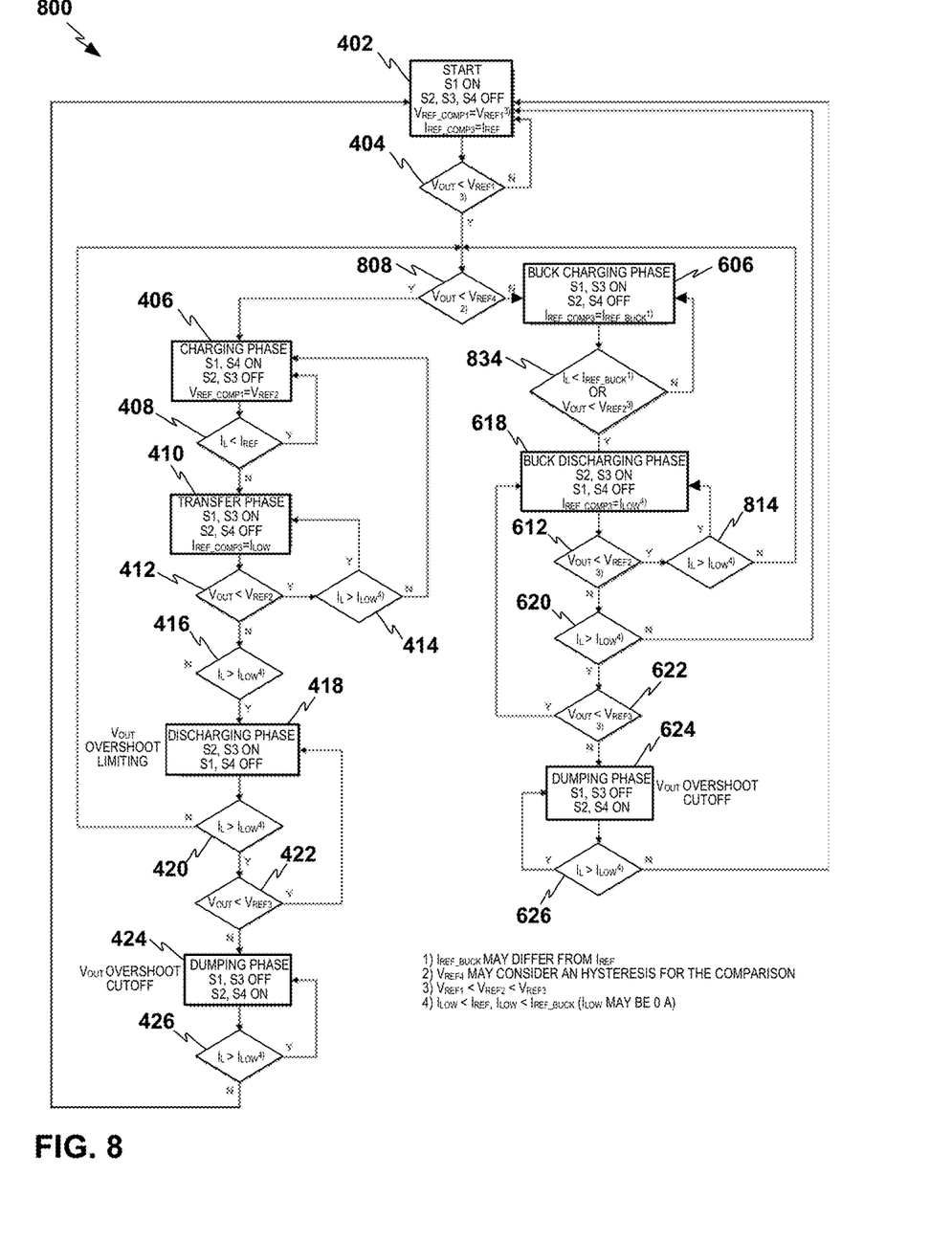
FIG. 8 is a flowchart illustrating a method of operating a buck-boost converter in a way that limits voltage overshoot and enables specific discharging phases for boost and buck modes, enhancing efficiency in both boost and buck modes based on efficient input voltage-controlled switching, among other advantages, in accordance with an example of this disclosure.

FIG. 7 is a block diagram illustrating a buck-boost converter 700 with switch control 740 that may control buck-boost converter 700 in an efficient PFM mode with multiple overshoot safeguards, efficient input voltage-controlled switching, and specific discharging phases for boost and buck modes, in accordance with another example of this disclosure. Buck-boost converter 700 of FIG. 7 is therefore analogous in some ways to buck-boost converter 500 of FIG. 5, but uses controlled switching for enhanced efficiency in either boost or buck mode based on the input voltage ($V_{IN}$) and not based on time durations or the input from a time window component. FIG. 8 is a flowchart illustrating a method 800 of operating buck-boost converter 700 in a way that limits voltage overshoot and enables specific discharging phases for boost and buck modes, enhancing efficiency in both boost and buck modes based on efficient input voltage-controlled switching, among other advantages, in accordance with an example of this disclosure. Aspects of method 800 of FIG. 8 are referenced below to describe aspects of operating buck-boost converter 700 of FIG. 7. Buck-boost converter 700 in the example of FIG. 7 may enhance efficiency flexibly in applications of a buck-boost converter operating in boost and/or buck modes, among other advantages.

Method 800 of operating buck-boost converter 700 may deliver various advantages of applying separate control strategies specific to either boost or buck mode, in accordance with the advantages described above for method 600 of operating buck-boost converter 500 to apply separate control strategies specific to either boost or buck mode. As can be seen in FIGS. 5-8, many components of buck-boost converter 700 are analogous to identically labeled components of buck-boost converter 500 of FIG. 5, and many aspects of method 800 are analogous to identically labeled aspects of method 600 of FIG. 6.

Buck-boost converter 700 of FIG. 7 differs from the examples of FIGS. 3 and 5 in part by including a fourth voltage reference 708, and a fourth comparator 728 that compares the input voltage ($V_{IN}$) at voltage input 120 (via conditioner 720) with the fourth reference voltage ($V_{REF4}$) from fourth voltage reference 708, thereby enabling input voltage-controlled switching in this example. Fourth voltage reference 708 may be considered to provide a mode decision reference voltage, in that it may be used to decide between operating in a buck mode or a boost mode. Method 800 differs from the example of method 600 in FIG. 6 including at decision points 808 and 834. In the example of method 800, after initial phase (402) and determining that the output voltage is less than the first reference voltage (404), switch control 740 determines whether the input voltage at voltage input 120 is less than the fourth reference voltage ($V_{REF4}$) from fourth voltage reference 708 (808). If voltage input 120 is less than the fourth reference voltage ($V_{REF4}$) from fourth voltage reference 708, switch control 740 engages buck-boost converter 700 in boost mode operations analogous to those described above with reference to the examples of FIGS. 4 and 6 (406-426).

If voltage input 120 is not less than the fourth reference voltage ($V_{REF4}$, i.e., the mode decision reference voltage) from fourth voltage reference 708, switch control 740 engages in buck mode operations largely analogous to those shown in the example of FIG. 6, though with significant distinctions, including beginning with buck charging phase (606). Switch control 740 may continue operating buck-boost converter 700 in buck charging phase (606) as long as the inductor current ($I_L$) is not less than the buck reference current ($I_{REF\_BUCK}$) (608) and the output voltage ($V_{OUT}$) at voltage output 134 is not less than the second reference voltage ($V_{REF2}$) (834). Once either the inductor current ($I_L$) is less than the buck reference current ($I_{REF\_BUCK}$) (608), or the output voltage ($V_{OUT}$) at voltage output 134 is less than the second reference voltage ($V_{REF2}$) (834), switch control 740 may engages buck-boost converter 700 in buck discharging phase (618).

From buck discharging phase (618), switch control 740 evaluates conditions and acts accordingly similarly to during buck discharging phase (618) in method 600 of the example of FIG. 6 (612, 620, 622). Method 800 in the buck discharging phase (618) differs from method 600 in that, when the output voltage ($V_{OUT}$) is less than the second reference voltage ($V_{REF2}$) (612), and the inductor current ($I_L$) is not greater than the reference low current ($I_{LOW}$) (814), switch control 740 does not simply return to the buck charging phase (606), but instead also determines again whether the input voltage at voltage input 120 is less than the mode decision reference voltage ($V_{REF4}$) from fourth voltage reference 708 (808). Switch control 740 then engages buck-boost converter 700 in the boost charging phase (406) or the buck charging phase (606) based on this determination of whether the input voltage at voltage input 120 is or is not, respectively, less than the mode decision reference voltage ($V_{REF4}$) from fourth voltage reference 708 (808).

Method 800 may, therefore, provide similar advantages in efficiency and threshold overshoot limiting with techniques specific to both boost and buck mode as described above with reference to the examples of FIGS. 5 and 6. Method 800 may also provide still further advantages in efficiency in some applications, in that it enables buck-boost converter 700 to proceed directly to a charging phase (406, 606) from the initial phase (402) in either boost mode (406) or buck mode (606), among other advantages.

Figure 9:
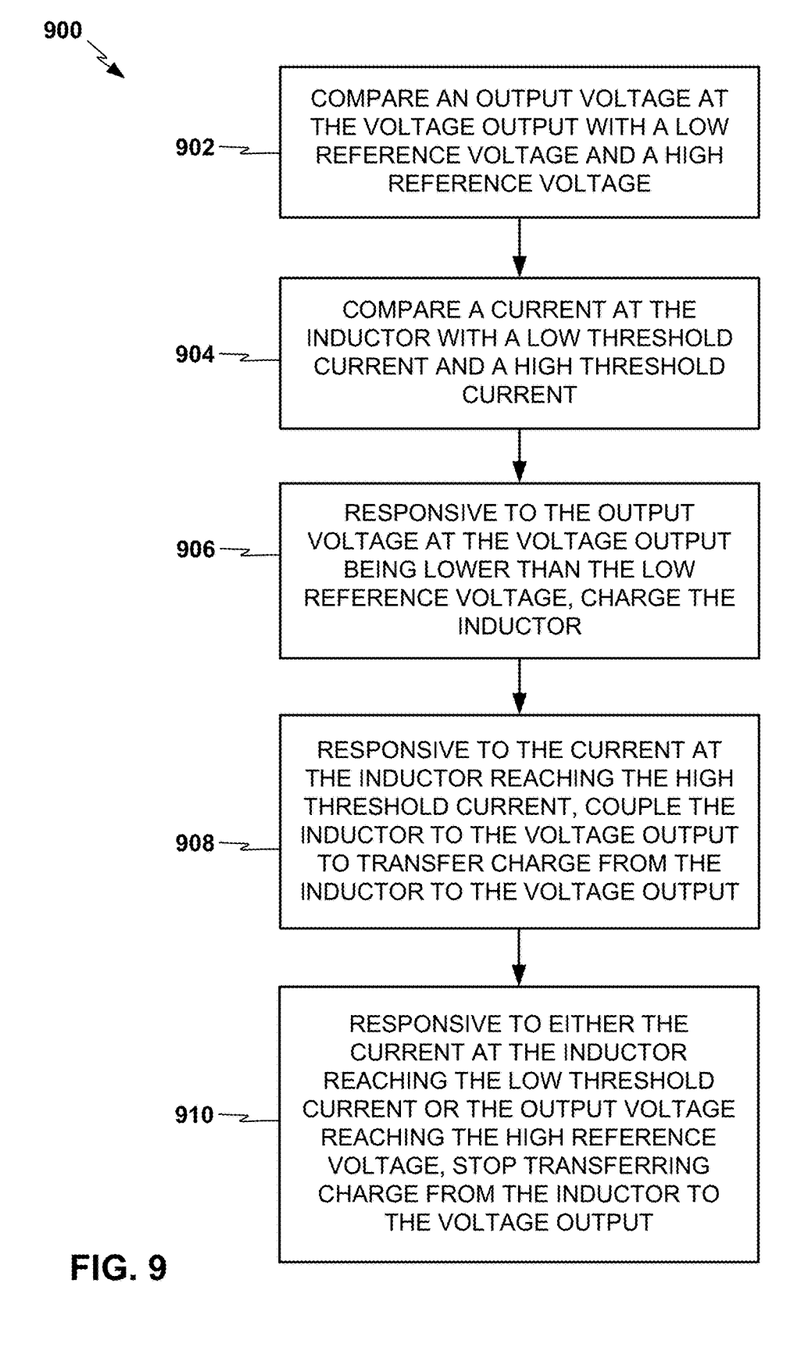
FIG. 9 is a flowchart illustrating a method of operating a buck-boost converter in a way that limits voltage overshoot and enhances efficiency, among other advantages, in accordance with an example of this disclosure.

FIG. 9 is a flowchart illustrating a method 900 of operating a buck-boost converter in a way that limits voltage overshoot and enhances efficiency, among other advantages, in accordance with an example of this disclosure. Method 900 may be a more generalized form of the operation of various switch controls and/or buck-boost converters of this disclosure, including a more generalized form of methods 400, 600, and 800 described above with reference to FIGS. 3-8.

In the example of FIG. 9, method 900 includes comparing an output voltage at the voltage output with a low reference voltage and a high reference voltage (e.g., comparing output voltage ($V_{OUT}$) at the voltage output 134 with a low reference voltage (e.g., $V_{REF1}$) (e.g., 404) and with a high reference voltage (e.g., $V_{REF2}$) (e.g., 412) as described with reference to FIGS. 3-8) (902). Method 900 further includes comparing a current at the inductor with a low threshold current and a high threshold current (e.g., comparing the inductor current ($I_L$) at inductor 110 to a reference low threshold current ($I_{LOW}$) (e.g., 414, 416) and to a reference high threshold current ($I_{REF}$) (e.g., 408) as described with reference to FIGS. 3-8) (904). Method 900 further includes, responsive to the output voltage at the voltage output being lower than the low reference voltage, charging the inductor (e.g., charging inductor 110 in either a boost mode or a buck mode, as in charging phase 406, 606 described with reference to FIGS. 3-8) (906).

Method 900 further includes, responsive to the current at the inductor reaching the high threshold current, coupling the inductor to the voltage output to transfer charge from the inductor to the voltage output (e.g., coupling output capacitor 130 to the voltage output 134 through the inductor 110, thereby discharging the inductor 110 in either a boost mode or a buck mode (e.g., 418, 618) (908). Method 900 further includes, responsive to either the current at the inductor reaching the low threshold current (e.g., 416) or the output voltage reaching the high reference voltage (e.g., 412), stopping transferring charge from the inductor to the voltage output (e.g., returning from 416 to 402 in FIG. 4) (910).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

For example, a switch control of this disclosure (e.g., switch controls 140, 340, 540, 740) may be implemented or embodied as an integrated circuit configured, via any combination of hardware, logic, general purpose processors, application specific integrated circuits (ASICs), field programmable gate arrays (FPGAs), and/or general processing circuits, which may execute software instructions in some examples, to perform various functions described herein. The integrated circuit may be configured to apply an output to charge the inductor. The integrated circuit may be further configured to evaluate a comparison of an output voltage at the voltage output with a reference voltage. The integrated circuit may be further configured to evaluate a comparison of a current at the inductor with a threshold current. The integrated circuit may be further configured to, responsive to the output voltage at the voltage output being higher than the reference voltage, and the current at the inductor being higher than the threshold current, apply an output to couple the output capacitor to the voltage output through the inductor.

Various examples of the invention have been described. These and other examples are within the scope of the following claims.

What is claimed is:

1. A device for controlling a buck-boost converter, wherein the buck-boost converter comprises an inductor, an output capacitor, and a voltage output, the device being configured to:

compare an output voltage at the voltage output with a low reference voltage and a high reference voltage;

compare a current at the inductor with a low threshold current and a high threshold current;

responsive to the output voltage at the voltage output being lower than the low reference voltage, charge the inductor;

responsive to the current at the inductor reaching the high threshold current, couple the inductor to the voltage output to transfer charge from the inductor to the voltage output;

responsive to the current at the inductor reaching the low threshold current, stop transferring charge from the inductor to the voltage output;

responsive to the output voltage reaching the high reference voltage, stop transferring charge from the inductor to the voltage output;

compare a duration of time for the charging of the inductor with an inductor charging phase reference time; and responsive to the current at the inductor being higher than the low threshold current, and the duration of time for the charging of the inductor being greater than the inductor charging phase reference time, couple the output capacitor to the voltage output through the inductor.

2. The device of claim 1, wherein the device is further configured to:

responsive to either the current at the inductor reaching the low threshold current or the output voltage reaching the high reference voltage, resume charging the inductor.

3. The device of claim 1, wherein the buck-boost converter further comprises a voltage input, and wherein the device is further configured to:

responsive to the output voltage reaching the high reference voltage while the current at the inductor remains above the low threshold current, stop transferring charge from the voltage input to the inductor while continuing to transfer charge from the inductor to the output.

4. The device of claim 1, wherein the buck-boost converter further comprises a voltage input, and wherein being configured to couple the inductor to the voltage output to transfer charge from the inductor to the voltage output comprises being configured to isolate the inductor from the voltage input.

5. The device of claim 1, wherein the device is further configured to:

responsive to the output voltage at the voltage output being higher than the high reference voltage, and the current at the inductor being higher than the low threshold current, transfer charge from the inductor to the output capacitor.

6. The device of claim 5, wherein the buck-boost converter further comprises a voltage input, and wherein being configured to transfer charge from the inductor to the output capacitor comprises being configured to isolate the inductor from the voltage input and the voltage output.

7. The device of claim 1, wherein being configured to charge the inductor comprises being configured to charge the inductor in a boost mode such that the output voltage is higher than an input voltage at a voltage input of the buck-boost converter, the device further being configured to:

responsive to the output voltage at the voltage output being lower than the high reference voltage, and the current at the inductor being lower than the low threshold current, charge the inductor in a buck mode such that the output voltage is lower than the input voltage.

8. The device of claim 1, wherein the device is further configured to:

responsive to the current at the inductor being higher than the low threshold current, and the output voltage at the voltage output being higher than an upper limit reference voltage that is higher than the high reference voltage, transfer charge from the inductor to the output capacitor.

9. The device of claim 1, wherein the buck-boost converter further comprises a voltage input, the device further being configured to:

compare an input voltage at the voltage input with a mode decision reference voltage that is independent of the low reference voltage and a high reference voltage;

responsive to the input voltage being lower than the mode decision reference voltage, perform the charging of the inductor in a boost mode such that the output voltage is higher than the input voltage; and responsive to the input voltage being higher than the mode decision reference voltage, perform the charging of the inductor in a buck mode such that the output voltage is lower than the input voltage.

10. The device of claim 9, wherein the device is further configured to:

compare the current at the inductor with a buck reference current while the charging of the inductor is in the buck mode, wherein the buck reference current is independent of the low threshold current and the high threshold current; and responsive to the current at the inductor being lower than the buck reference current, or the output voltage at the voltage output being lower than the high reference voltage, couple the output capacitor to the voltage output through the inductor.

11. The device of claim 1, wherein the buck-boost converter further comprises a voltage input, and wherein charging the inductor comprises configuring the device to connect a gate between the input and the inductor and to connect a gate between the inductor and the output capacitor.

12. The device of claim 1, wherein the device is configured to control timing of discharge of the inductor to control efficiency of the buck-boost converter.

13. A method of controlling a buck-boost converter, wherein the buck-boost converter comprises an inductor, an output capacitor, and a voltage output, the method comprising:

comparing an output voltage at the voltage output with a low reference voltage and a high reference voltage;

comparing a current at the inductor with a low threshold current and a high threshold current;

responsive to the output voltage at the voltage output being lower than the low reference voltage, charging the inductor;

responsive to the current at the inductor reaching the high threshold current, coupling the inductor to the voltage output to transfer charge from the inductor to the voltage output;

responsive to the current at the inductor reaching the low threshold current, stopping transferring charge from the inductor to the voltage output;

responsive to the output voltage reaching the high reference voltage, stopping transferring charge from the inductor to the voltage output comparing a duration of time for the charging of the inductor with an inductor charging phase reference time; and responsive to the current at the inductor being higher than the low threshold current, and the duration of time for the charging of the inductor being greater than the inductor charging phase reference time, coupling the output capacitor to the voltage output through the inductor.

14. The method of claim 13, further comprising:

responsive to either the current at the inductor reaching the low threshold current or the output voltage reaching the high reference voltage, resuming charging the inductor.

15. The method of claim 13, wherein the buck-boost converter further comprises a voltage input, the method further comprising:

responsive to the output voltage reaching the high reference voltage while the current at the inductor remains above the low threshold current, stopping transferring charge from the voltage input to the inductor while continuing to transfer charge from the inductor to the output.

16. The method of claim 13, wherein the buck-boost converter further comprises a voltage input, and wherein coupling the inductor to the voltage output to transfer charge from the inductor to the voltage output comprises isolating the inductor from the voltage input.

17. The method of claim 13, wherein the buck-boost converter further comprises a voltage input, the method further comprising:

responsive to the output voltage at the voltage output being higher than the high reference voltage, and the current at the inductor being higher than the low threshold current, transferring charge from the inductor to the output capacitor, wherein transferring charge from the inductor to the output capacitor comprises isolating the inductor from the voltage input and the voltage output.

18. The method of claim 13, wherein the buck-boost converter further comprises a voltage input, the method further comprising:

comparing an input voltage at the voltage input with a mode decision reference voltage that is independent of the low reference voltage and a high reference voltage;

responsive to the input voltage being lower than the mode decision reference voltage, performing the charging of the inductor in a boost mode such that the output voltage is higher than the input voltage;

responsive to the input voltage being higher than the mode decision reference voltage, performing the charging of the inductor in a buck mode such that the output voltage is lower than the input voltage;

comparing the current at the inductor with a buck reference current while the charging of the inductor is in the buck mode, wherein the buck reference current is independent of the low threshold current and the high threshold current; and responsive to the current at the inductor being lower than the buck reference current, or the output voltage at the voltage output being lower than the high reference voltage, coupling the output capacitor to the voltage output through the inductor.

19. An integrated circuit for controlling a buck-boost converter, wherein the buck-boost converter comprises an inductor, an output capacitor, and a voltage output, the integrated circuit being configured to:

compare an output voltage at the voltage output with a low reference voltage and a high reference voltage;

compare a current at the inductor with a low threshold current and a high threshold current;

responsive to the output voltage at the voltage output being lower than the low reference voltage, charge the inductor;

responsive to the current at the inductor reaching the high threshold current, couple the inductor to the voltage output to transfer charge from the inductor to the voltage output;

responsive to the current at the inductor reaching the low threshold current, stop transferring charge from the inductor to the voltage output;

responsive to the output voltage reaching the high reference voltage, stop transferring charge from the inductor to the voltage output compare a duration of time for the charging of the inductor with an inductor charging phase reference time; and responsive to the current at the inductor being higher than the low threshold current, and the duration of time for the charging of the inductor being greater than the inductor charging phase reference time, couple the output capacitor to the voltage output through the inductor.

* * * * *